(12) United States Patent
Leibig et al.

(10) Patent No.: US 12,306,048 B2
(45) Date of Patent: May 20, 2025

(54) NON-INVASIVE MEASUREMENT AND CALCULATION SYSTEM

(71) Applicant: OMEGA Engineering, Inc., Norwalk, CT (US)

(72) Inventors: Kenneth Leibig, Coatesville, PA (US); Matthew Annen, Audubon, PA (US); Ye Zhu, Weymouth, MA (US); David Alan Austin, Jr., Philadelphia, PA (US)

(73) Assignee: OMEGA ENGINEERING, INC., Norwalk, CT (US)

( * ) Notice: Subject to any disclaimer, the term of this patent is extended or adjusted under 35 U.S.C. 154(b) by 566 days.

(21) Appl. No.: 17/673,045

(22) Filed: Feb. 16, 2022

(65) Prior Publication Data

US 2022/0260432 A1    Aug. 18, 2022

Related U.S. Application Data

(60) Provisional application No. 63/186,388, filed on May 10, 2021, provisional application No. 63/149,837, filed on Feb. 16, 2021.

(51) Int. Cl.
*G01K 17/00* (2006.01)
*G01K 1/024* (2021.01)
(Continued)

(52) U.S. Cl.
CPC ............ *G01K 17/00* (2013.01); *G01K 1/024* (2013.01); *G01K 1/08* (2013.01); *G01K 1/143* (2013.01); *G01K 7/16* (2013.01)

(58) Field of Classification Search
CPC .......... G01K 17/00; G01K 1/024; G01K 1/08; G01K 1/143; G01K 7/16; G01K 7/427; G01K 13/02
See application file for complete search history.

(56) References Cited

U.S. PATENT DOCUMENTS 4,096,575 A    6/1978 Itoh
4,415,279 A    11/1983 Beuse et al.
(Continued)

FOREIGN PATENT DOCUMENTS

CN    206055027 U    3/2017
DE    202012104736 U1    3/2013
(Continued)

OTHER PUBLICATIONS

International Preliminary Report on Patentability issued in corresponding PCT Application No. PCT/US2022/016549, mailed on Mar. 6, 2024.
(Continued)

*Primary Examiner* — John E Breene
*Assistant Examiner* — Janice M Soto
(74) *Attorney, Agent, or Firm* — Dilworth IP, LLC

(57) ABSTRACT

A non-invasive measuring device calculates a temperature of a medium in a container or conduit. The device includes at least one first sensor disposed on an exterior surface of the container or conduit and measures a temperature ($T_o$) of the exterior surface. The measuring device also includes at least one second sensor disposed on the exterior surface and measures a heat flux (q") moving through a wall of the container or conduit. The measuring device further includes a processor operatively coupled to the first sensor and the second sensor. The processor is configured to receive the temperature ($T_o$) measurements and the heat flux (q") measurements from the first sensor and the second sensor and to calculate a temperature of the medium in the container or conduit based on input variables about the container or conduit including radius, thickness and thermal conductivity of the material of the container or conduit.

22 Claims, 6 Drawing Sheets

(51) Int. Cl.
  *G01K 1/08* (2021.01)
  *G01K 1/143* (2021.01)
  *G01K 7/16* (2006.01)

(56) References Cited

U.S. PATENT DOCUMENTS

| | | | |
|---|---|---|---|
| 5,920,617 | A | 7/1999 | Berger et al. |
| 6,278,051 | B1 | 8/2001 | Peabody |
| 6,558,036 | B2 | 5/2003 | Gysling et al. |
| 8,136,983 | B2 | 3/2012 | Razzaghi |
| 9,970,828 | B2 | 5/2018 | Ude |
| 10,234,338 | B2 | 3/2019 | Rieder et al. |
| 10,317,295 | B2 | 6/2019 | Rud et al. |
| 10,386,246 | B2 | 8/2019 | Disselnkoetter et al. |
| 2002/0150143 | A1 | 10/2002 | Tokita et al. |
| 2014/0161151 | A1 | 6/2014 | Proctor et al. |
| 2017/0049397 | A1 | 2/2017 | Sun et al. |
| 2017/0184523 | A1 | 6/2017 | Keda et al. |
| 2017/0212065 | A1 | 7/2017 | Rud et al. |
| 2018/0003872 | A1 | 2/2018 | Ozaki et al. |
| 2020/0096397 | A1 | 3/2020 | Rud |
| 2020/0150064 | A1 | 5/2020 | Rud et al. |
| 2020/0408580 | A1 | 12/2020 | Gebhardt et al. |
| 2023/0221192 | A1 | 7/2023 | Hwang et al. |

FOREIGN PATENT DOCUMENTS

| | | |
|---|---|---|
| EP | 0908712 A | 4/1999 |
| EP | 3087304 B1 | 8/2018 |
| EP | 3537124 A1 | 9/2019 |
| JP | S55149025 A | 11/1980 |
| JP | 2015-197313 A | 11/2015 |
| RU | 98240 U1 | 10/2010 |
| RU | 2466365 C1 | 11/2012 |
| WO | 2014037257 A2 | 3/2014 |
| WO | 2016202971 A1 | 12/2016 |
| WO | 2018180800 A1 | 10/2018 |
| WO | 2019063519 A1 | 4/2019 |
| WO | 2021003140 A1 | 1/2021 |

OTHER PUBLICATIONS

International Search Report and Written Opinion issued in corresponding PCT Application No. PCT/US2022/016549, dated May 23, 2022.
Babi, "Strap Units and Remote Probe Units", p. 1, Product Manual, 2017; Retrieved May 1, 2022; https://www.bapihvac.com/wp-content/uploads/StrapUnits_temp_NoPrice-v17.pdf.
Extended European Search Report and Search Opinion received for EP Application No. 22756810.2, mailed on Nov. 25, 2024, 13 pages.
Office Action received for Japanese Patent Application No. 2023-549111, mailed on Aug. 27, 2024, 8 pages (4 pages of English Translation and 4 pages of Original Document).

Section 2-2

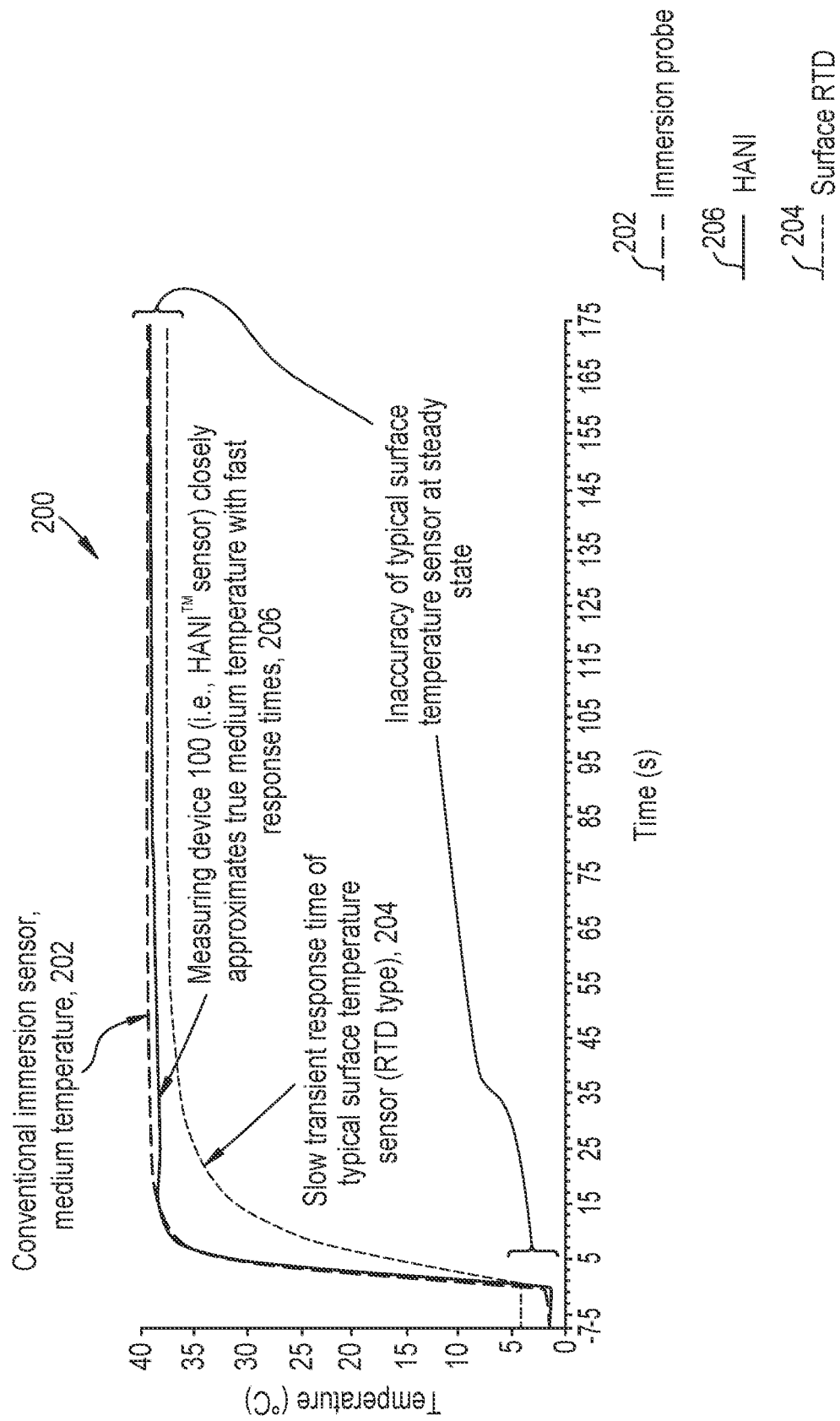

NON-INVASIVE MEASUREMENT AND CALCULATION SYSTEM

CROSS-REFERENCE TO RELATED APPLICATION

This application is a U.S. non-provisional of and claims priority benefit under 35 U.S.C. § 119(e) to U.S. Provisional Patent Application, Ser. Nos. 63/149,837, filed Feb. 16, 2021, and 63/186,388, filed May 10, 2021, the disclosures of these U.S. patent documents are incorporated by reference herein in their entireties.

COPYRIGHT NOTICE

A portion of the disclosure of this patent document contains material, which is subject to copyright protection. The copyright owner has no objection to the facsimile reproduction by anyone of the patent document or the patent disclosure, as it appears in the United States Patent and Trademark Office files or records, but otherwise reserves all copyright rights whatsoever.

BACKGROUND

1. Field of the Invention

The present disclosure relates generally to a measuring device and methods for non-invasively calculating a temperature of a medium in a container or conduit and, more particularly, to a measuring device and methods for calculating the temperature of the medium using heat conduction principles and without penetrating the container or the conduit.

2. Description of Related Art

This description of related art is provided to generally present the context of the present disclosure. Unless otherwise indicated the information described in this section is not prior art to the claimed invention as disclosed in this patent document and is not admitted prior art by inclusion herein.

In many industries, process variables such as, for example, pressure or temperature of a medium, for example, a fluid, moving through a conduit, for example, a pipe, or stored in a container, should be known to monitor and/or to accurately control a process or process flow in a preferred or optimal manner. Some currently existing solutions for temperature measurement include, for example, the use of an immersion temperature probe that is disposed within the medium to be measured. Generally speaking, immersion probes are perceived to have many downsides including, but not limited to, for example: relatively high installation costs to add a new measuring location which may include cutting the conduit or container and welding a fitting to carry the measuring device that can require shutting the process line down for installation; relatively high costs to reposition or relocate a previously installed measuring device at a different location; unless a thermowell is used, the process line must be shut down to replace, calibrate, or otherwise perform maintenance on the measuring device; when the medium is comprised of a corrosive or an abrasive material, or the material has a current condition that is at a relatively high temperature or pressure, the material may damage the measuring device; or when process material builds up on the probe, the build-up may cause accuracy or response time challenges. Additional downsides in the use of immersion probes can include inaccuracies in measuring configuration, for example, a correct immersion length of, for example, about fifteen times a diameter of a probe is preferred to ensure accuracy, and wake frequency calculations may be needed to ensure the process pressure and flow do not damage the probe. In some embodiment, the use of thermowells may help with many of the challenges and downsides illustrated herein, but thermowells introduce other challenges such as, for example, slow response times and inaccuracies.

Accordingly, the inventors have determined that if process variables such as a temperature of a medium moving through or within a conduit or container could be known without having to penetrate the conduit or container, there would be many advantages.

SUMMARY

The present invention resides in one aspect in a non-invasive measuring device configured to calculate a temperature of a medium in and/or passing through a container or conduit without penetrating the container or conduit. The measuring device includes a first sensor in thermal contact with an exterior surface of a container or conduit. The first sensor measures a temperature ($T_o$) of the exterior surface. The measuring device also includes a second sensor in thermal contact with the exterior surface of the container or conduit. The second sensor measures a heat flux ($q''$) moving through a wall of the container or conduit. The measuring device further includes a processor operatively coupled to the first sensor and the second sensor. The processor is configured to receive the temperature ($T_o$) measurements and the heat flux ($q''$) measurements from the first sensor and the second sensor and to calculate a temperature of the medium in and/or passing through the container or conduit. In one embodiment, a thermal interface material is disposed between the first sensor, the second sensor, and the exterior surface of the container or the conduit. The thermal interface material is seen to, for example, improve thermal contact between the sensors and the exterior surface due to imperfect heat transfer at the boundary/interface between the container or conduit and the sensors.

In one embodiment, the surface temperature sensor is a resistance temperature (RTD) sensor and the heat flux sensor is a thin film thermopile sensor. In one embodiment, the processor employs an empirical thermal contact conductance ($h_c$) in the calculation of the temperature of the medium in and/or passing through the container or conduit. The thermal contact conductance ($h_c$) is a term associated with imperfect heat transfer between the container and/or conduit and the sensors. In one embodiment, the thermal contact conductance ($h_c$) is used to, for example, account for variations in a surface finish and/or other inconsistencies between the container and/or conduit and is empirically derived from testing thermal heat transfer between various types (e.g., material composition and/or finish) of containers and/or conduits and the measuring device.

In still another embodiment, the measuring device further includes a housing configured to be affixed to the exterior surface of the container or conduit. The housing has an interior chamber enclosing the first sensor, the second sensor and the processor at least partially therein. In one embodiment, the measuring device further includes a selectively adjustable securing mechanism. The securing mechanism is used to attach and detach the housing of the measuring device to and from the container or the conduit without mechanical tools. In one embodiment, the securing mechanism includes a flexible strap and a latch rotatable about a hinge portion between a closed position and an open position. In the closed position, the latch applies tension to the flexible strap to attach the housing of the measuring device to the container or the conduit. In the open position, the latch releases the tension applied to the flexible strap to enable movement and to detach the housing of the measuring device from the container or the conduit.

In yet another embodiment, the non-invasive measuring device includes a digital communication device operatively coupled to an IO controller for at least one of wired and wireless communication, directly and/or over a communication network, between the measuring device and at least one of one or more data processing devices and one or more data storage devices. In one embodiment, the data processing devices include input devices operable by a user to enter input including at least one of data, information, variables, and parameters and to send the input to the processor of the measuring device for use in the calculation of the temperature of the medium in or passing through the container or conduit. In one embodiment, the input of the at least one of data, information, variables, and parameters include at least one of an outer wall radius ($r_o$), a wall thickness ($t_o$), and a material thermal conductivity ($k_o$) of the container and/or conduit. In one embodiment, the input of the at least one of data, information, variables, and parameters include a value of the empirical thermal contact conductance ($h_c$) at an interface of the container and/or conduit and the non-invasive measuring device. In one embodiment, the more data processing devices include output devices for exhibiting to a user at least one of the data, information, variables, and parameters received from the processor of the measuring device including values of the temperature (Tcalc) of the medium in the container or conduit.

In still another embodiment, a non-invasive measuring device is configured to calculate a temperature of a medium in a container or conduit. The measuring device comprises a first sensor in thermal contact at an interface with an exterior surface of a container or conduit such that the first sensor measures a temperature ($T_o$) of the exterior surface. The measuring device also includes a second sensor in thermal contact at the interface with the exterior surface of the container or conduit. The second sensor measures a heat flux (q") moving through a wall of the container or conduit. The measuring device further includes a processor operatively coupled to the first sensor and the second sensor. The processor is configured to receive the temperature ($T_o$) measurements from the first sensor, the heat flux (q") measurements from the second sensor, and an empirical thermal contact conductance ($h_c$) at the interface of the container or conduit and the measuring device, and to calculate a temperature of the medium in the container or conduit.

BRIEF DESCRIPTION OF THE DRAWINGS

The foregoing aspects and other features of the presently disclosed embodiments are explained in the following description, taken in connection with the accompanying drawings, wherein:

FIG. 5 depicts measurements, temperature (° C.) versus time (seconds), from the non-invasive measuring device of FIG. 1 as compared to measurements from a conventional immersion temperature probe and from a conventional temperature sensor disposed on an exterior surface of a conduit.

In these figures like structures are assigned like reference numerals but may not be referenced in the description of all figures.

BRIEF DESCRIPTION OF PREFERRED EMBODIMENTS

As described herein, the inventors have discovered an improved, non-invasive measuring device and methods for calculating a process parameter such as, for example, a temperature, of a medium in or passing through a container (e.g., tank) or a conduit (e.g., pipe) using heat conduction principles. The non-invasive measuring device is referred to herein as the HANI™ sensor (HANI is a trademark of Omega Engineering, Inc. (Norwalk, CT USA), a subsidiary of Spectris plc). The non-invasive measuring device and methods for calculating a process parameter, in accordance with preferred embodiments, are described using an exemplary installation on a pipe of a defined diameter or radius and execution of algorithms to calculate temperature readings over a time period of a medium in and/or passing through the pipe, it should be appreciated however that the invention is not limited by this example embodiment. For example, the present invention applies to a non-invasive measuring device and methods for calculating a process parameter such as a temperature of a medium in or passing through any configuration of container or conduit including those of various shapes, sizes, and/or material compositions such as those with a flat, square, rectangular, oblong and/or circular cross-section at a measuring point (e.g., installation point of the measuring device) on the surface of the container or conduit.

Figure 1:
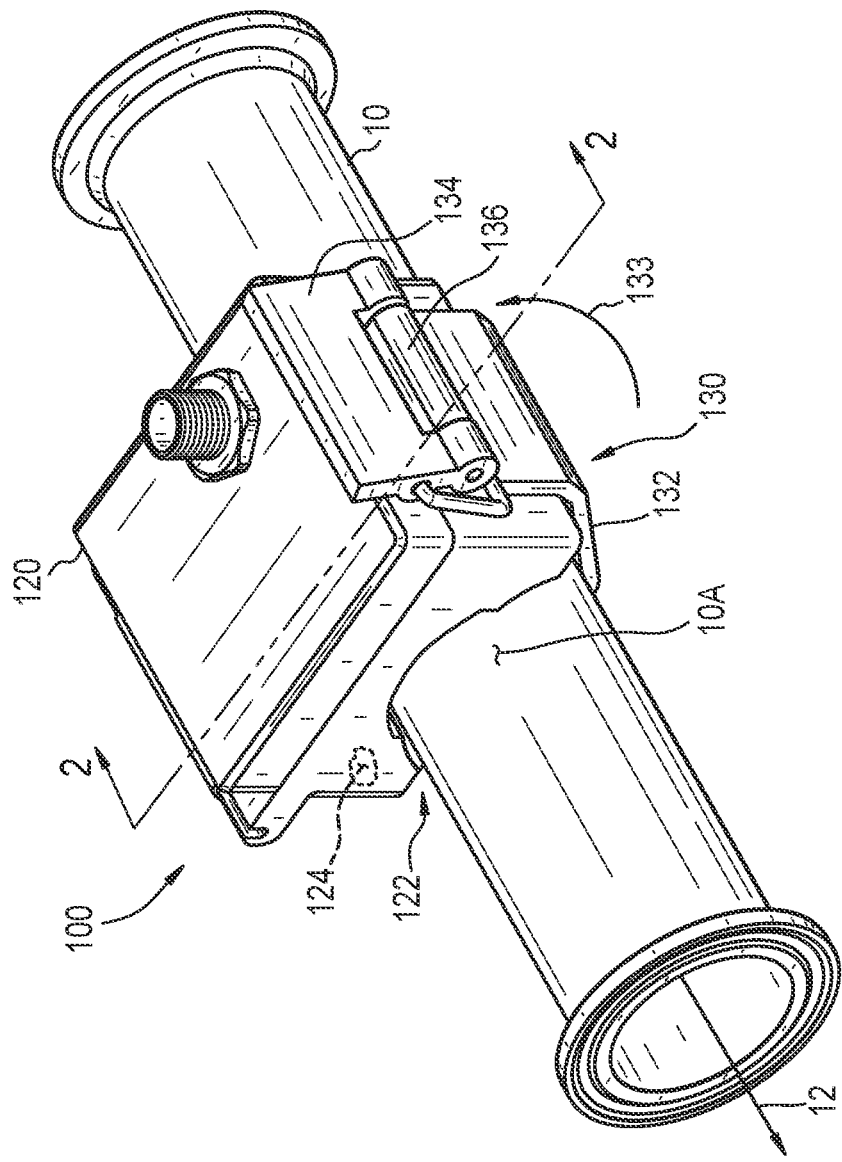
FIG. 1 is a simplified diagram of a non-intrusive measuring device affixed to an exterior surface of a conduit for calculating the temperature of a medium within the conduit, in accordance with one embodiment.

FIGS. 1 to 4 depict one embodiment of a non-invasive measuring device 100. FIG. 1 is a simplified schematic diagram of the non-invasive measuring device 100 coupled to a container or a conduit such as, for example, a pipe 10, for calculating or determining a temperature, of a medium, shown generally at 12, in and/or passing through the pipe 10 without the measuring device 100, or portions thereof, penetrating the pipe 10. The measuring device 100 includes a housing 120 configured to be affixed to or about an exterior surface, shown generally at 10A, of the pipe 10. For example, as shown in FIG. 1, a portion, shown generally at 122, of housing 120 is adapted to receive at least a portion of the pipe 10 such that the exterior surface 10A of the pipe 10 is in thermal contact with the measuring device 100, including processing components 140 and sensing components 160 of FIGS. 2 and 3, described in detail below, of the measuring device 100 disposed in the housing 120.

As shown in FIG. 1, a selectively adjustable securing mechanism, shown generally at 130, is attached to the housing 120 and is deployable to fasten the housing 120 about the pipe 10. In one embodiment, the securing mechanism 130 includes a flexible strap 132 and a latch 134. The strap 132 is disposed about the exterior surface 10A of the pipe 10 opposite the portion 122 of the housing 120. In one embodiment, one end of the strap 132 is releasably disposed about the latch 134. The latch 134 is closed or locked, for example, by rotating the latch 134 about a hinge portion 136 of the securing mechanism 130 upwardly toward the housing 120 in a direction indicated by arrow 133. As the latch 134 is rotated toward a closed or locked position, tension is applied to tighten and secure the strap 132 against the pipe 10. It should be appreciated that when the latch 134 is opened or unlocked, for example, rotated about the hinge portion 136 downwardly away from the housing 120 in a direction opposite to that indicated by arrow 133, the applied tension is released and the strap 132 is loosened and not held against the pipe 10. When the latch 134 is opened, the strap 132 freely passes over or along the exterior surface 10A of the pipe 10 such that the housing 120 can be relocated about the pipe 10 or removed from the pipe 10. In one embodiment, the end of the strap 132 may be selectively released from the latch 134 such that the measuring device 100 is more readily fully detachable from the exterior surface of the container or conduit.

While the selectively adjustable securing mechanism 130 is described above as including the flexible strap 132 and the latch 134, it should be appreciated that it is within the scope of the present disclosure to provide other means for selectively securing the housing 120 about the container or conduit, e.g., pipe 10. For example, in one embodiment, the securing mechanism 130 may include a segment adapted to receive at least a portion of the pipe 10, for example, opposite the portion 122 of the housing 120. The segment and housing 120 may each include one or more holes through which one or more fasteners, for example, a bolt or rod, can be inserted. Each fastener has threads on an exterior surface thereof to receive a nut. When the nut is tightened on the fastener, the nut and fastener cooperate to apply a compressive force to secure the housing 120 and the segment against the pipe 10. The fasteners (e.g., nut and bolt) may be partially or fully loosened or unscrewed to release the compressive force and to allow a gap between the segment and the housing 120 for relocation and/or removal of the securing mechanism 130 and housing 120. While the fastener above is described as a nut and bolt, it should be appreciated that it is within the scope of the present invention to selectively secure the housing 120 about the container (e.g., tank) or conduit (e.g., pipe) with any other coupling means known to those of ordinary skill in the art.

While not shown in detail in FIG. 1, it should be appreciated that the housing 120 includes an interior chamber 124 enclosing a tension spring 110, a thermal interface material 116, as well as the processing 140 and the sensing components 160 of the measuring device 100. In one embodiment, the thermal interface material 116 is comprised of, for example, a silicone-based gap filler material with relatively high thermal conductivity. The thermal interface material 116 advantageously deforms to fill gaps between the sensing components 160 and the container or conduit (e.g., pipe 10), conforming to the exterior surface 10A to eliminate, or at least substantially minimize, inconsistent thermal contact therewith. Exemplary materials include but are not limited to, clay, paste, or elastic materials.

Figure 2:
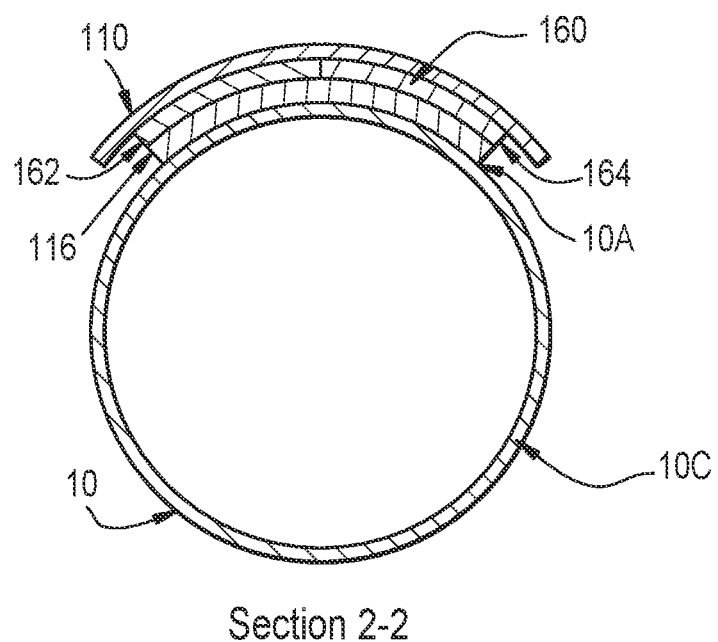
FIG. 2 depicts a partial cross section of the non-intrusive measuring device affixed to the exterior surface of the conduit taken along line 2-2 of FIG. 1, in accordance with one embodiment illustrating mechanical components of the invention.

As shown in FIG. 2, which is a partial cross-sectional view taken along line 2-2 of FIG. 1, the non-invasive measuring device 100 is affixed about the pipe 10. It should be appreciated that the housing 120 of the measuring device 100 is not shown in FIG. 2 to more clearly depict components of the measuring device 100 disposed within the housing 120. For example, in one embodiment, the thermal interface material 116 is disposed about the exterior surface 10A of the pipe 10 and below the sensing components 160 to improve thermal contact between the pipe 10 and the sensing components 160. The sensing components 160 include at least one of a first sensor 162 and at least one of a second sensor 164, described in detail below, in thermal contact with the exterior surface 10A of the pipe 10. The tension spring 110 provides a downward, compressible force toward the external surface 10A to ensure the first and the second sensors 162 and 164 are in good thermal contact with the exterior surface 10A of the container or conduit, e.g., the pipe 10, and the thermal interface material 116, if the interface material 116 is provided in an application of use. In one embodiment, a recess (not shown) is provided in a lower surface (e.g., a wall or floor) of the housing 120 to receive the tension spring 110 and assist in directing the downward, compressive force therefrom to hold the sensors 162 and 164 and the thermal interface material 116 (if used) against the exterior surface 10A of the pipe 10.

In one embodiment, it is seen as preferred practice to clean the exterior surface 10A of the pipe 10 or container just prior to installation of the measuring device 100 to ensure good operative, thermal contact between the pipe 10 and the measuring device 100, e.g., one free of interference from oil, dust, dirt, debris, rust, or the like, disposed on the exterior surface 10A of the pipe 10 or container. It should be appreciated that in one embodiment it is also preferred practice to have the first and the second sensors 162 and 164 located in a side-by-side (e.g., adjacent within a common measurement location for exposure to substantially the same environmental condition) but not an overlapping arrangement. It should also be appreciated that in some embodiments, it may be preferred to have one or more of the at least one first sensor 162 and/or the at least one second sensor 164 comprised of, for example, two or more first sensors 162 and/or two or more second sensors 164, wherein measurements therefrom may be summed and averaged to provide an output of the first sensor 162 and the second sensor 164, respectively.

Figure 3:
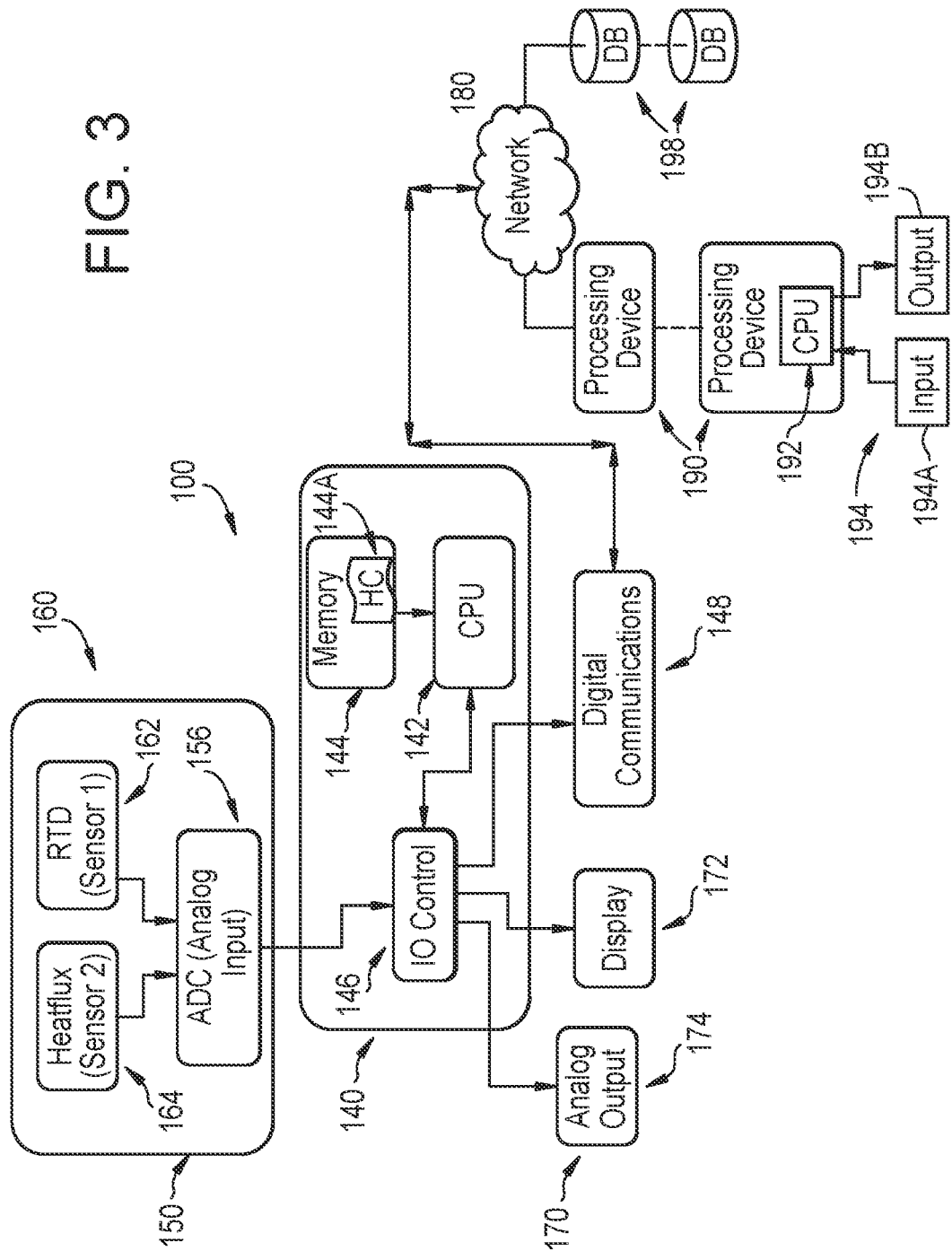
FIG. 3 is a simplified schematic diagram of components of the non-intrusive measuring device of FIG. 1, in accordance with one embodiment.

In one embodiment, illustrated in FIG. 3, the processing components 140 of the non-invasive measuring device 100 may include a processor or CPU 142 operatively coupled to a memory device 144 and an input-output (IO) controller 146. The memory device 144 includes heat conduction algorithms HC 144A stored therein and executed by the processor 142 to calculate or to determine a process parameter such as, for example, a temperature, of the medium 12 in a container (e.g., a tank) or conduit (e.g., a pipe) and/or passing through the container or conduit, e.g., the pipe 10. As shown in FIG. 3, the IO controller 146 is operatively coupled to input devices 150 to receive signals therefrom and to output devices 170 to send signals thereto. In one embodiment, the input devices 150 include the sensing components 160. For example, in one embodiment, the sensing components 160 include at least one of the first sensor 162, shown schematically as Sensor 1, and at least one of the second sensor 164, shown schematically as Sensor 2. In one embodiment, the at least one first sensor 162 is comprised of one or more temperature sensors such as, for example, one or more resistance temperature (RTD) sensors. In one embodiment, the at least one second sensor 164 is comprised of one or more heat flux sensors. In one embodiment, the input devices 150 also include an Analog-to-Digital Converter (ADC) 156 to receive input signals from the sensing components 160 (e.g., the first and second sensors 162 and 164) to provide the signals to the IO controller 146.

Figure 4A:
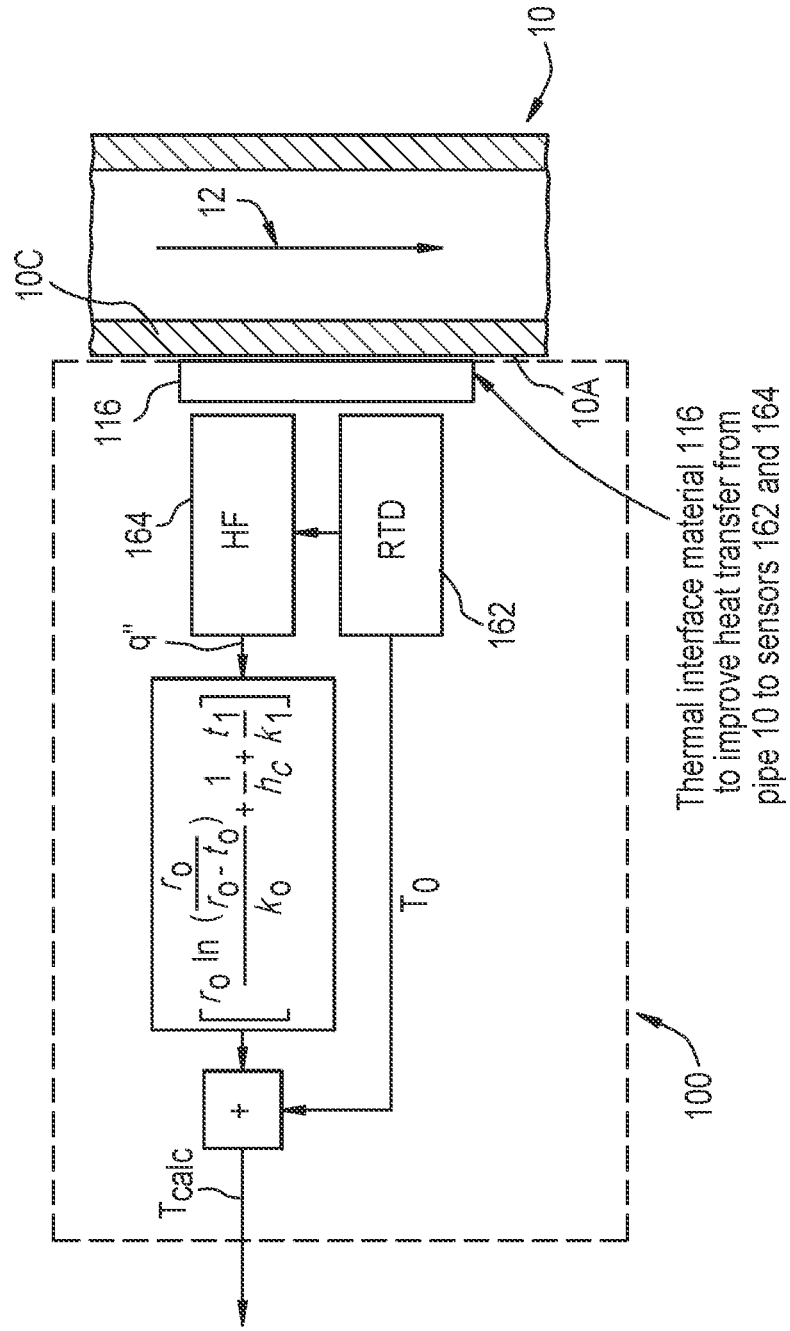
FIGS. 4A and 4B are simplified functional diagrams of components of the non-invasive measuring device of FIG. 1, in accordance with one embodiment.
Figure 4B:
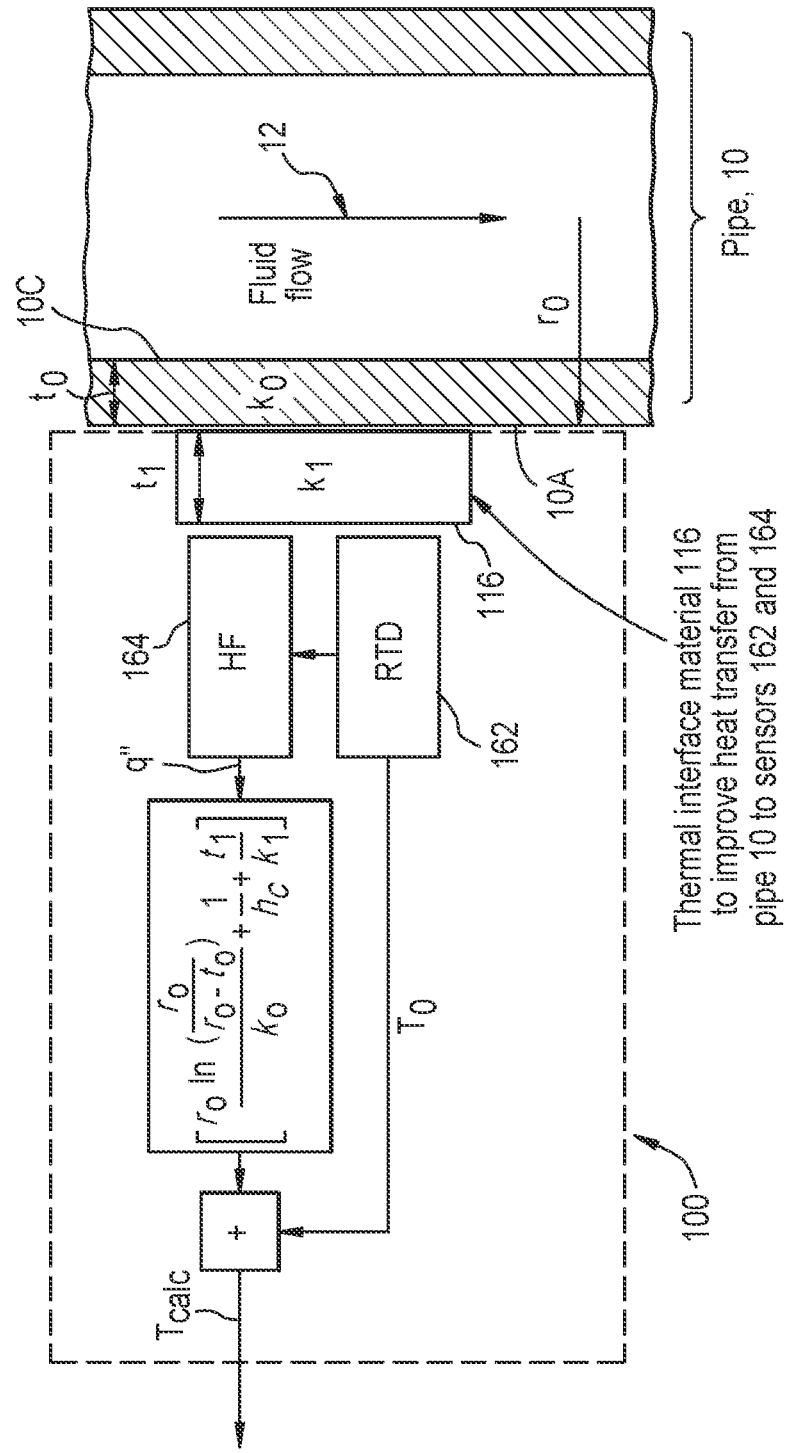

As described herein and depicted in FIGS. 3 and 4A and 4B, the first sensor 162 and the second sensor 164 of the non-invasive measuring device 100 cooperate to measure a temperature $T_o$ on the outside (e.g., the exterior surface 10A) of the conduit (e.g., pipe 10) and a heat flux q" moving through a wall (e.g., wall 10C shown in FIGS. 2, 4A and 4B) of the conduit (e.g., pipe 10), respectively. The temperature $T_o$ measurement from the first sensor 162 and the heat flux q" measurement from the second sensor 164 are communicated from the first sensor 162 and the second sensor 164 to the processor 142 as input to the heat conduction algorithms HC 144A executed by the processor 142 to calculate or to determine a temperature $T_{calc}$ of the medium 12 in the interior of the pipe 10.

As described herein, the temperature $T_{calc}$ is calculated using the following equation (Equation 1), in applications of use where the thermal interface material 116 is not disposed against the exterior surface 10A of the conduit (e.g., pipe 10):

$$T_{calc} = q'' \left[ \frac{r_o \ln\left(\frac{r_o}{r_o - t_o}\right)}{k_o} + \frac{1}{h_c} \right] + T_o \qquad \text{EQUATION 1}$$

Where: $T_o$=temperature (° C.) measured by sensor 162;
q"=heat flux per unit area (w/m²) moving through pipe wall 10C, as measured by sensor 164;
$r_o$=pipe outer wall 10C radius (m);
$t_o$=pipe wall 10C thickness (m);
$k_o$=pipe material thermal conductivity [w/(m*° C.)]; and
$h_c$=Empirical thermal contact conductance at the interface of the pipe 10 and the measuring device 100.

It should be appreciated that in certain configurations of the container or the conduit, for example, when the cross-section of the container or conduit at an installation or measuring point of the measuring device 100 includes one or more flat sidewalls (e.g., conduit or container is non-circular) the $r_0*\ln(r_0/r_0-t_0)$ term approaches $t_o$, as the container or conduit has no radius.

In another embodiment, for example, in applications of use where the thermal interface material 116 is disposed against the exterior surface 10A of the conduit (e.g., pipe 10), the temperature $T_{calc}$ is calculated using the following equation (Equation 2):

$$T_{calc} = q'' \left[ \frac{r_o \ln\left(\frac{r_o}{r_o - t_o}\right)}{k_o} + \frac{1}{h_c} + \frac{t_1}{k_1} \right] + T_o \qquad \text{EQUATION 2}$$

Where: $T_o$=temperature (° C.) measured by sensor 162;
q"=heat flux per unit area (w/m²) moving through pipe wall 10C, as measured by sensor 164;
$r_o$=pipe outer wall 10C radius (m);
$t_o$=pipe wall 10C thickness (m);
$k_o$=pipe material thermal conductivity [w/(m*° C.)];
$t_1$=thermal interface material 116 wall thickness (m);
$k_1$=thermal interface material 116 thermal conductivity [w/(m*° C.)]; and
$h_c$=Empirical thermal contact conductance at the interface of the pipe 10 and the thermal interface material 116.

Once again, it should be appreciated that in certain configurations of the container or the conduit, for example, when the cross-section of the container or conduit at an installation or measuring point of the measuring device 100 includes one or more flat sidewalls (e.g., conduit or container is non-circular) the $r_0*\ln(r_0/r_0-t_0)$ term approaches $t_o$, as the container or conduit has no radius.

As described above, in some embodiments of the present invention, a thermal interface material 116 is disposed about the exterior surface 10A of the pipe 10 to improve thermal contact (thermal coupling) between the pipe 10 and the sensing components 160 including the at least one first sensor 162 and the at least one second sensor 164. The empirical thermal contact conductance, $h_c$, is a term associated with imperfect heat transfer between the container (e.g., tank) and/or conduit (e.g., pipe) and the sensors 162 and 164 of the measuring device 100. The term is used to, for example, account for variations in a surface finish and/or other inconsistencies between the container (e.g., tank) and/or conduit (e.g., pipe). The term $h_c$ is empirically derived from testing thermal heat transfer between various types (e.g., material composition and/or finish) of containers (e.g., tanks) and/or conduits (e.g., pipes) and the measuring device 100. As the thermal interface material 116 improves thermal conductivity between the exterior surface 10A of the pipe 10 and the sensing components 160, preferred performance of the thermal interface material 116 substantially minimizes the thermal contact conductance, $1/h_c$, term (e.g., the term tends toward a zero (0) value). For example, through experimentation, the inventors have determined the empirical thermal contact conductance value $h_c$ may be relatively smaller for industrial conduits (e.g., pipes) with poor or rough surface finishes, and relatively larger for sanitary pipes with high polish surface finishes in which heat transfer is more ideal. In one embodiment, the empirical thermal contact conductance value $h_c$ is dependent, e.g., varies, on the composition of the thermal interface material 116. For example, when the thermal interface material 116 is comprised of a material that is well suited as a gap filler between the container or conduit (e.g., pipe 10), the empirical thermal contact conductance value $h_c$ is a higher value. TABLE 1, for example, provides a range of values of the empirical thermal contact conductance value $h_c$ for different types of conduits. Values are shown in TABLE 1, wherein the thermal interface material 116 is comprised of a silicone-based thermal interface material and the conduits include a relatively high polished sanitary pipe as compared to an industrial pipe having a relatively rough surface finish.

TABLE 1

| | Thermal Contact Conductance, $h_c$ (W/m²K) | |
|---|---|---|
| | Min | max |
| Sanitary high-polish pipes | 200 | 300 |
| Industrial rough-surface pipes | 100 | 200 |

Referring again to FIG. 3, when the temperature $T_{calc}$ is determined by the processor 142, the value may be communicated to one of the output devices 170 including, for example, a display device 172 for exhibiting the temperature $T_{calc}$ values calculated over a period of time, a printer or plotter (not shown) for printing or graphing one or more of the temperature $T_{calc}$ values, or a storage device for storing the temperature $T_{calc}$ values. In one embodiment, the non-invasive measuring device 100 includes means for wired and/or wireless digital communication, e.g., a transmitter/ receiver 148 operatively coupled to the IO controller 146 to communicate, e.g., send to and/or receive from, signals including data, information, variables, and/or parameters used in or generated by the processor 142 during operation of the measuring device 100, with one or more processing devices 190 and/or one or more data storage devices 198, directly or over a communication network 180 such as, for example, a local area network or a global network such as the internet.

In one embodiment, the output devices 170 include an analog output device 174 capable of interfacing directly or over the communication network 180 with, e.g., local process control and monitoring equipment using industry accepted standard current or voltage signals that are proportional to the measured temperature. The analog output device 174 may be located in proximity to the measuring device 100 or, alternatively, the analog output 174 may be coupled to the one or more processing devices 190 and the output signals (e.g., $T_{calc}$) are communicated over the communications network 180. In one embodiment, one or more output temperature measurements, e.g., the calculated temperature $T_{calc}$, are output and/or exhibited in one or more industry accepted standard units of measure such as, e.g., a Centigrade (° C.) or Fahrenheit (° F.) temperature measurements.

In one embodiment, the one or more processing devices 190 are comprised of one or more general purpose computers, workstations, and/or portable computing devices such as, for example, a personal digital assistant (PDA), laptop computer, tablet computer, Internet-enabled mobile radiotelephone, or like portable computing devices. As is known to those skilled in the art, the processing devices 190 each include a processor or CPU 192, computer-readable medium or memory, and input-output devices 194 including keyboards or other devices 194A for input of data, information, variables, and/or parameters, displays 194B for exhibiting input and output signals, and devices for facilitating communication over the network 180. The processors 192 of each of the processing devices 190 execute program instructions stored in the memory such that persons operating individual ones of the processing devices 190 may view the output signals from the processor 142 of the measuring device 100 and/or may enter and transmit values as data, information, variables and/or parameters as input to the processor 142 executing the heat conduction algorithms HC 144A. For example, as described herein, input may include adjustments to variables and/or parameters employed, for example, in Equation 1 and Equation 2, based on, for example, user or customer particular applications including, but not limited to, range of sensing temperature and deviations thereof, container (e.g., tank) and/or conduit (e.g., pipe) type, size, diameters and material composition (metallic and/or non-metallic materials), including container and/ or conduit outer wall radius ($r_o$), wall thickness ($t_o$), and material thermal conductivity ($k_o$), and the like.

FIG. 5 is a time-temperature graph depicting measurements of temperature (° C.) on a vertical, y-axis (e.g., in a range from about 0° C. to 40° C.), and time (seconds) on a horizontal, x-axis (e.g., in a range from about −7 to 175 seconds), for the non-invasive measuring device 100 of the present invention as compared to measurements from a conventional immersion temperature probe and from a conventional temperature sensor (e.g., RTD sensor) disposed on an exterior surface of a conduit.

The measurement data 200 depicted in FIG. 5 was obtained during experiments where a fluid (e.g., medium 12) is moving through a pipe (as indicated by the arrows in FIGS. 1, 4A and 4B). An immersion probe is disposed in the pipe and within a path of the fluid. A non-invasive, temperature sensor such as, for example, a resistance type temperature (RTD) sensor and the non-invasive measuring device 100 of the present invention are disposed on an exterior surface of the pipe. During the experiment, the temperature of the fluid is changed rapidly from about one degree Celsius (1° C.) to about thirty-nine degrees Celsius (39° C.) starting at about a zero (0) second mark during the test cycle, and the measurement data 200 (data points) were obtained from each of the immersion probe, temperature surface sensor, and non-invasive measuring device. A first line 202 plots data points (temperature measurements at time increments) taken by the immersion probe. A second line 204 plots data points taken by the RTD surface sensor. A third line 206 plots data points taken by the non-invasive measuring device 100, e.g., the HANI™ sensor.

Assuming that the immersion probe (line 202) is a relatively accurate representation of the actual temperature of the fluid in the pipe, given its direct contact with the fluid, FIG. 5 illustrates a marked improvement in the accuracy and response time of the non-invasive measuring of the temperature of the fluid in the pipe comparing the two surface mounting measuring techniques of the RTD surface sensor and the non-invasive measuring device 100 of the present invention. For example, as shown on line 204, the RTD surface sensor is seen to have a slow transient response and is a few degrees inaccurate at the steady state condition. As described herein, when a similar surface mounted RTD sensor (e.g., sensor 162) is used in conjunction with a heat flux sensor (e.g., sensor 164) and both the first sensor 162 and second sensor 164 provide input to the heat conduction algorithms HC 144A executed by the processor 142, the resulting calculated temperature $T_{calc}$ of the fluid (as shown on line 206) as provided by the HANI sensor (i.e., the non-invasive measuring device 100) more closely approximates the actual temperature of the fluid moving through the pipe represented by line 202 of the immersion probe. As shown in the graph of FIG. 5, the line 206 has an improved response time in the transient state and has improved accuracy in the steady state.

In one embodiment, wherein the heat flux sensor, the sensor 164, is comprised of a thin film thermopile that averages the heat flux over a surface area of the pipe 10, some benefits of the measuring device 100 employing this type of a heat flux sensor include:

Stability: By taking an average heat flux over an area an energy transfer rate that is measured is seen to be more stable than that of a measurement taken at a single point. For example, a single point may be affected by hot or cold spots on the surface of the pipe 10 due to, for example, inconsistencies like rust, material imperfections, surface contact imperfections, material thickness imperfections, and material buildup on the interior of the pipe 10.

Modularity: The present design allows for a modular approach by using a same heat flux sensor for a range of pipe diameters. The thin film averaging heat flux sensor is a flexible sensor, so it can be applied, when coupled with a tension spring (e.g., the tension spring 110), to many different pipe diameters, rather than a design in which the pipe diameter must be known and exact, and therefore the construction of the measuring device 100 specific to accommodate the pipe diameter.

Response time: When the heat flux sensor is comprised of a thin film thermopile type, it has a very small thermal mass and can be directly coupled to the pipe or with a thermal interface material. This relatively small thermal mass and direct coupling are seen to be advantageous for providing a faster system thermal response time, which can result in faster measurement and control of the system. Conventional temperature measuring techniques, even if they are employed in non-invasive measuring system, are not seen to have recognized the benefits of utilizing a heat flux sensor as described herein. As such, conventional systems are seen to have slower response times as compared to the measuring device 100. For example, when the temperature of the fluid inside the conduit (e.g., pipe 10) is changing temperature rapidly, the heat flux sensor term (e.g., q" of Equation 1 and/or Equation 2) changes rapidly before the entire system is able to react to the temperature change. In these transient temperature change conditions, the heat flux sensor (e.g., sensor 164) improves the response time of the non-invasive measuring device 100 as compared to a conventional RTD surface sensor that is not coupled with a heat flux sensor (e.g., the herein-described arrangement and cooperation of the first sensor 162 and the second sensor 164).

It should also be appreciated that the non-invasive measuring device 100, which employs the heat conduction algorithm HC 144A (including Equation 1 and/or Equation 2) executed by the processor 142 to calculate or determine the temperature $T_{calc}$ of the medium 12 in the interior of the pipe 10, is relatively easily mountable, moveable, and/or removable by design without, in some embodiments, the use of any screws, bolts, or tools. For example, in one embodiment, a selectively adjustable securing mechanism 130 includes the flexible strap 132 being adjustable in tension that can wrap and be secured against (e.g., be means of tension applied by the latch 134) various diameters or portions of conduits or containers. As disclosed herein, the non-invasive measuring device 100 fits onto and works with an existing conduit (e.g., pipe) or container (e.g., tank) and requires no modification to the existing conduit or container. Accordingly, adaptability is seen as an additional beneficial feature of the disclosed device 100. For example, variables or parameters provided to the measuring device 100 are easily adaptable to a large combination of pipe materials and dimensions by allowing users to specify pipe materials, diameters, and characteristics, for example, through software/algorithm or physical (e.g., displays or buttons) interface to the processing components 140. In one embodiment, the non-invasive measuring device 100 and the heat conduction algorithms HC 144A include adjustments to variables and/or parameters employed, for example, in Equation 1 and/or Equation 2, based on, for example, user or customer particular applications including, but not limited to, range of sensing temperature and deviations thereof, container (e.g., tank) and/or conduit (e.g., pipe) type, size, diameters and material composition, including container and/or conduit outer wall radius ($r_o$), wall thickness ($t_o$), and material thermal conductivity ($k_o$), and the like. In one embodiment, the heat conduction algorithms HC 144A are adaptable for use with metallic and/or non-metallic container (e.g., tank) and/or conduit (e.g., pipe), and the like.

The foregoing description is only illustrative of the present embodiments. Various alternatives and modifications can be devised by those skilled in the art without departing from the embodiments disclosed herein. Accordingly, the embodiments are intended to embrace all such alternatives, modifications and variances which fall within the scope of the present disclosure and one or more of the appended claims.

What is claimed is:

1. A non-invasive measuring device configured to calculate a temperature of a medium in a container or conduit, the measuring device comprising:
   a temperature sensor in thermal contact with an exterior surface of a container or conduit, the temperature sensor measuring and outputting a temperature ($T_o$) of the exterior surface;
   a heat flux sensor in thermal contact with the exterior surface of the container or conduit, the heat flux sensor measuring and outputting a heat flux (q") moving through a wall of the container or conduit;
   an I/O controller operatively coupled to the temperature sensor and the heat flux sensor to receive the output temperature ($T_o$) and the output heat flux (q") therefrom;
   a digital communication device operatively coupled to the I/O controller for at least one of wired or wireless communication between the non-invasive measuring device and one or more data processing devices, the digital communication device receiving a value of at least one parameter used to calculate a temperature of the medium in the container or conduit, the value including a selectively inputted or adjusted value made at the one or more data processing devices based on at least one of a range of sensing temperatures or characteristics of the container or conduit; and
   a processor operatively coupled to the I/O controller, the processor configured to receive the temperature ($T_o$) measurements, the heat flux (q") measurements, and the value of the at least one parameter from the I/O controller and to calculate the temperature of the medium in the container or conduit;
   wherein the calculated temperature ($T_{calc}$) is determined as follows:

$$T_{calc} = q'' \left[ \frac{F_c t_0}{k_0} + \frac{1}{h_c} \right] + T_0$$

where:
   $T_o$=temperature is measured by the temperature sensor;
   q"=heat flux per unit area is measured by the heat flux sensor;
   $F_c$=factor of a cross-sectional configuration of the container or conduit;
   $t_o$=wall thickness of the container or conduit;
   $k_o$=thermal conductivity of container or conduit material; and
   $h_c$=Empirical thermal contact conductance at the interface of the container or conduit and the non-invasive measuring device.

2. The non-invasive measuring device of claim 1, wherein the container or conduit is cylindrical and wherein the factor ($F_c$) is determined as follows:

$$F_c = \frac{r_0}{t_0} \ln\left(\frac{r_0}{r_0 - t_0}\right)$$

where: $r_o$=radius of outer wall of the container or conduit; and
   $t_o$=wall thickness of the container or conduit; and
   wherein the calculated temperature ($T_{calc}$) is determined as follows:

$$T_{calc} = q'' \left[ \frac{r_o \ln\left(\frac{r_0}{r_o - t_o}\right)}{k_o} + \frac{1}{h_c} \right] + T_o.$$

3. The non-invasive measuring device of claim 2, wherein the temperature sensor is a resistance temperature (RTD) sensor.

4. The non-invasive measuring device of claim 2, wherein the heat flux sensor is a thin film thermopile sensor.

5. The non-invasive measuring device of claim 2, wherein the temperature sensor and the heat flux sensor are disposed on the exterior surface of the container or conduit and provide the output temperature ($T_o$) and the output heat flux (q") to the I/O controller.

6. The non-invasive measuring device of claim 2, further comprising a housing configured to be affixed to the exterior surface of the container or conduit, the housing having an interior chamber enclosing the temperature sensor, the heat flux sensor, the I/O controller, and the processor at least partially therein.

7. The non-invasive measuring device of claim 6, further comprising a selectively adjustable securing mechanism for attaching and for detaching the housing of the measuring device to the container or the conduit without mechanical tools.

8. The non-invasive measuring device of claim 7, wherein the securing mechanism includes a flexible strap disposed about the exterior surface of the container or conduit and a latch that receives the flexible strap and is rotatable about a hinge portion between a closed position, wherein the latch applies tension to the flexible strap to tighten the flexible strap about the exterior surface and to attach the measuring device to the container or the conduit, and an open position, wherein the latch releases the tension applied to the flexible strap to loosen the flexible strap about the exterior surface to enable movement and to detach the measuring device from the container or the conduit.

9. The non-invasive measuring device of claim 2, further comprising a tension spring biasing the temperature sensor and the heat flux sensor toward the exterior surface of the container or conduit.

10. The non-invasive measuring device of claim 2, wherein the IO controller receives signals from input devices and sends signals to output devices.

11. The non-invasive measuring device of claim 10, wherein the input devices include one or more of the temperature sensors, one or more of the heat flux sensors, and an analog-to-digital converter.

12. The non-invasive measuring device of claim 10, wherein the output devices include at least one of a display device, a printer, a plotter, one or more data storage devices, or the one or more data processing devices.

13. The non-invasive measuring device of claim 10, wherein the one or more data processing devices include input devices that are operable by a user to enter input including the value of the at least one parameter and to send the input to the processor of the measuring device for use in the calculation of the temperature of the medium in the container or conduit.

14. The non-invasive measuring device of claim 13, wherein the input of the value of the at least one parameter includes at least one of an outer wall radius ($r_o$), a wall thickness ($t_o$), or a material thermal conductivity ($k_o$) of the container or conduit.

15. The non-invasive measuring device of claim 13, wherein the input of the value of the at least one parameter includes a value of an empirical thermal contact conductance ($h_c$) at an interface of the container or conduit and the measuring device.

16. The non-invasive measuring device of claim 10, wherein the one or more data processing devices include output devices for exhibiting to a user at least one of the value of the at least one parameter received by the processor of the measuring device or values of the temperature ($T_{calc}$) of the medium in the container or conduit.

17. A non-invasive measuring device configured to calculate a temperature of a medium in a container or conduit, the measuring device comprising:
    a temperature sensor in thermal contact at an interface with an exterior surface of a container or conduit, the temperature sensor measuring and outputting a temperature ($T_o$) of the exterior surface;
    a heat flux sensor in thermal contact at the interface with the exterior surface of the container or conduit, the heat flux sensor measuring and outputting a heat flux (q") moving through a wall of the container or conduit;
    an I/O controller operatively coupled to the temperature sensor and the heat flux sensor to receive the output temperature ($T_o$) and the output heat flux (q") therefrom;
    a digital communication device operatively coupled to the I/O controller for at least one of wired or wireless communication between the non-invasive measuring device and one or more data processing devices, the digital communication device receiving a value of at least one parameter used to calculate a temperature of the medium in the container or conduit, the value including a selectively inputted or adjusted value made at the one or more data processing devices based on at least one of a range of sensing temperature or characteristics of the container or conduit; and
    a processor operatively coupled to the I/O controller, the processor configured to:
        receive the temperature ($T_o$) measurements, the heat flux (q") measurements, and the value of the at least one parameter from the I/O controller; and
        calculate the temperature of the medium in the container or conduit based on the temperature ($T_o$) measurements, the heat flux (q") measurements, the value of the at least one parameter including at least one of an empirical thermal contact conductance ($h_c$) at the interface of the container or conduit and the measuring device, a thermal conductivity of container or conduit material ($k_o$), or a factor of a cross-sectional configuration of the container or conduit ($F_c$);
    wherein when the container or conduit is cylindrical, the processor is further configured to:
    calculate the factor of the cross-sectional configuration of the container or conduit ($F_c$) based on a radius of outer wall of the container or conduit ($r_o$) and a wall thickness of the container or conduit ($t_o$).

18. The non-invasive measuring device of claim 17, wherein the processor is further configured to:
    receive values of the radius of the outer wall of the container or conduit ($r_o$) and of the wall thickness of the container or conduit ($t_o$) from the digital communication device via the I/O controller.

19. The non-invasive measuring device of claim 17, wherein the one or more data processing devices include input devices operable to selectively input the inputted or adjusted value of the at least one parameter.

20. A non-invasive measuring device configured to calculate a temperature of a medium in a container or conduit, the measuring device comprising:

a temperature sensor in thermal contact with an exterior surface of a container or conduit, the temperature sensor measuring and outputting a temperature ($T_o$) of the exterior surface;

a heat flux sensor in thermal contact with the exterior surface of the container or conduit, the heat flux sensor measuring and outputting a heat flux (q") moving through a wall of the container or conduit;

an I/O controller operatively coupled to the temperature sensor and the heat flux sensor to receive the output temperature ($T_o$) and the output heat flux (q") therefrom;

a digital communication device operatively coupled to the I/O controller for at least one of wired or wireless communication between the non-invasive measuring device and one or more data processing devices, the digital communication device receiving a value of at least one parameter used to calculate a temperature of the medium in the container or conduit, the value including a selectively inputted or adjusted value made at the one or more data processing devices based on at least one of a range of sensing temperatures or characteristics of the container or conduit;

a processor operatively coupled to the I/O controller, the processor configured to receive the temperature ($T_o$) measurements, the heat flux (q") measurements, and the value of the at least parameter from the I/O controller and to calculate the temperature of the medium in the container or conduit; and a thermal interface material disposed on the exterior surface, and wherein the temperature sensor and the heat flux sensor are disposed on the interface material in a side-by-side and non-overlapping arrangement;

wherein the calculated temperature ($T_{calc}$) is determined as follows:

$$T_{calc} = q'' \left[ \frac{F_c t_0}{k_0} + \frac{1}{h_c} + \frac{t_1}{k_1} \right] + T_0$$

where: $T_o$=temperature is measured by the temperature sensor;
q"=heat flux per unit area is measured by the heat flux sensor;
$F_c$=factor of a cross-sectional configuration of the container or conduit;
$k_o$=thermal conductivity of container or conduit material;
$t_1$=wall thickness of thermal interface material;
$k_1$=thermal conductivity of thermal interface material; and
$h_c$=Empirical thermal contact conductance at the interface of the container or conduit and the non-invasive measuring device.

21. The non-invasive measuring device of claim 20, wherein the container or conduit is cylindrical and wherein the factor ($F_c$) is determined as follows:

$$F_c = \frac{r_0}{t_0} \ln\left(\frac{r_0}{r_0 - t_0}\right)$$

where: $r_o$=radius of outer wall of the container or conduit; and
$t_o$=wall thickness of the container or conduit; and wherein the calculated temperature ($T_{calc}$) is determined as follows:

$$T_{calc} = q'' \left[ \frac{r_o \ln\left(\frac{r_0}{r_o - t_o}\right)}{k_o} + \frac{1}{h_c} + \frac{t_1}{k_1} \right] + T_o.$$

22. The non-invasive measuring device of claim 20, wherein the one or more data processing devices include input devices operable to selectively input the inputted or adjusted value of the at least one parameter.

* * * * *